US012791737B2

(12) United States Patent
Bolte

(10) Patent No.: US 12,791,737 B2
(45) Date of Patent: Nov. 10, 2026

(54) ASSURING GPS PSEUDORANGE MEASUREMENTS WITH NETWORKED GPS RECEIVERS

(71) Applicant: BAE Systems Information and Electronic Systems Integration Inc., Nashua, NH (US)

(72) Inventor: Ethan C. Bolte, Hiawatha, IA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 275 days.

(21) Appl. No.: 18/646,341

(22) Filed: Apr. 25, 2024

(65) Prior Publication Data

US 2025/0334704 A1 Oct. 30, 2025

(51) Int. Cl.

| | |
|---|---|
| ***H04L 1/00*** | (2006.01) |
| ***G01S 19/48*** | (2010.01) |
| ***G01S 19/51*** | (2010.01) |
| ***G01S 19/52*** | (2010.01) |

(52) U.S. Cl.

CPC .............. *G01S 19/48* (2013.01); *G01S 19/51* (2013.01); *G01S 19/52* (2013.01)

(58) Field of Classification Search

CPC ........ G01S 19/215; G01S 19/48; G01S 19/51; G01S 19/52; G01S 19/21; H04L 63/1446; H04W 12/122; H04W 4/02; G06Q 30/0623

See application file for complete search history.

(56) References Cited

U.S. PATENT DOCUMENTS

2013/0317944 A1* 11/2013 Huang ................ G01S 5/02521 455/457
2026/0072177 A1* 3/2026 Gum ..................... G01S 19/215

* cited by examiner

*Primary Examiner* — Phuoc H Doan
(74) *Attorney, Agent, or Firm* — Sand, Sebolt & Wernow LPA; Gary McFaline

(57) ABSTRACT

A method of signifying an assurance status of an unassured user. The method includes steps of: installing a computer program product for assurance on a computer readable medium of an unassured user that is executable by a processor of the unassured user, and installing the computer program product for assurance on a computer readable medium of an assured user that is executable by a processor of the assured user. When executed, processor of the assured user is caused to: time tag an unassured datalink message received from the unassured user by an assured receiver of the assured user; send an assured location measurement and an assured datalink message to the unassured user from an assured transceiver of the assured user; compare an unassured location measurement received from the unassured user and the assured location measurement based on an assurance threshold; and signify an assurance status of the unassured user.

20 Claims, 10 Drawing Sheets

ASSURING GPS PSEUDORANGE MEASUREMENTS WITH NETWORKED GPS RECEIVERS

TECHNICAL FIELD

The present disclosure generally relates to a network system having users that categorizes one or more new users at an assured status or at an unassured status based on at least two data ranges that are separate and independent from one another.

BACKGROUND ART

In network systems, the acts of cyber-attacks and other hostile cybercrime actions are becoming more prominent with the increase in computer and cyber technology. In one example, spoofing is a specific type of cyber-attack where a hostile or adverse user attempts to use a computer, device, or network to trick or deceive other computer networks or devices by posing as a legitimate, trusted entity. Spoofing may also occur in situations where the adverse user or network successfully identifies as another similar device or network by falsifying data to gain an illegitimate advantage. If such acts of spoofing occur, such adverse user or entity may be capable of accessing and collecting private or sensitive information by posing as a trusted or known entity. In current times, such acts of spoofing or similar cyber-attacks may occur in multiple systems, including military systems or networks and civilian systems or networks.

With respect to military systems, such acts of spoofing and similar cyber-attacks may be detrimental to one or more devices or networks in a military operation or area. In one instance, acts of spoofing may be dangerous in military systems when such devices and/or networks are classified as known or safe based on geolocation systems, global navigation satellite system (GNSS), and global positioning system (GPS). In this instance, such adverse or hostile entities may structure and broadcast messages that provide false or illegitimate locations of the device or platform relative to susceptible devices, platforms, or networks during military operations. In these cases, such susceptible devices, platforms, or networks may then be placed in a dangerous or hostile situation given the use of false or illegitimate information broadcasted by the adverse entity. In civilian systems, the spoofing or cyber-attacks are equally detrimental.

As such, there is a need to adequately determine and classify adverse or hostile entities to prevent the acts of spoofing or cyber-attacks in both military systems and civilian systems.

SUMMARY OF THE INVENTION

In one aspect, an exemplary embodiment of the present disclosure may provide a computer program product having instructions stored on a non-transitory machine-readable medium of each assured user of a network system and is executable by a processor of the assured user that, when executed by the processor, causes a process to be carried out for signifying assurance of an unassured user. The instructions of the computer program product include command an assured receiver of the assured user to time tag an unassured datalink message received from the unassured user; command an assured transceiver of the assured user to send an assured location measurement and an assured datalink message to the unassured user; command the assured receiver of the assured user to compare an unassured location measurement received from the unassured user and the assured location measurement based on an assurance threshold; and command the assured transceiver of the assured user to signify assurance of the unassured user.

This exemplary embodiment or another exemplary embodiment may further include that unassured user is signified as assured when a difference between the unassured location measurement and the assured location measurement is less the assurance threshold. This exemplary embodiment or another exemplary embodiment may further include that the unassured user is signified as unassured when a difference between the unassured location measurement and the assured location measurement is greater the assurance threshold. This exemplary embodiment or another exemplary embodiment may further include that command the unassured user to compute a global positioning system (GPS) sourced distance between the assured location measurement and the unassured location measurement. This exemplary embodiment or another exemplary embodiment may further include that that computation performed by the unassured user is a GPS position-velocity-time (PVT) technique. This exemplary embodiment or another exemplary embodiment may further include that computation performed by the unassured user is a double differencing technique.

In another aspect, an exemplary embodiment of the present disclosure may provide a computer program product having instructions stored on a non-transitory machine-readable medium of each assured user of a network system and is executable by a processor of the assured user that, when executed by the processor, causes a process to be carried out for signifying assurance of an unassured user. The instructions of the computer program product include: command an assured transceiver of the assured user to extend communication to a second assured user; command an assured receiver of the second assured user to time tag an unassured datalink message received from the unassured user; command an assured transceiver of the second assured user to send an assured location measurement and an assured datalink message to the unassured user; command the assured receiver of the second assured user to compare an unassured location measurement received from the unassured user and the assured location measurement based on an assurance threshold; and command the assured transceiver of the second assured user to signify assurance of the unassured user.

This exemplary embodiment or another exemplary embodiment may further include that the unassured user is signified as assured when a difference between the unassured location measurement and the assured location measurement is less the assurance threshold. This exemplary embodiment or another exemplary embodiment may further include that the unassured user is signified as unassured when a difference between the unassured location measurement and the assured location measurement is greater the assurance threshold. This exemplary embodiment or another exemplary embodiment may further include command the unassured user to compute a global positioning system (GPS) sourced distance between the assured location measurement and the unassured location measurement. This exemplary embodiment or another exemplary embodiment may further include that computation performed by the unassured user is a GPS position-velocity-time (PVT) technique. This exemplary embodiment or another exemplary embodiment may further include that computation performed by the unassured user is a double differencing technique.

In yet another aspect, an exemplary embodiment of the present disclosure may provide a method of signifying an assurance of an unassured user provided in a contested region. The method includes steps of: installing a computer program product for assurance on a computer readable medium of an unassured user that is executable by a processor of the unassured user; installing the computer program product for assurance on a computer readable medium of an assured user that is executable by a processor of the assured user, wherein the computer program product which, when executed by the processor, causes the processor to: time tag an unassured datalink message received from the unassured user by an assured receiver of the assured user; send an assured location measurement and an assured datalink message to the unassured user from an assured transceiver of the assured user; compare an unassured location measurement received from the unassured user and the assured location measurement based on an assurance threshold; and signify assurance of the unassured user.

This exemplary embodiment or another exemplary of the present disclosure may further include that when a difference between the unassured location measurement and the assured location measurement is less the assurance threshold, the unassured user is signified as assured. This exemplary embodiment or another exemplary of the present disclosure may further include that when a difference between the unassured location measurement and the assured location measurement is greater the assurance threshold, the unassured user is signified as unassured. This exemplary embodiment or another exemplary of the present disclosure may further include a step of computing a global positioning system (GPS) sourced distance between the assured location measurement and the unassured location measurement by the processor of the unassured user. This exemplary embodiment or another exemplary of the present disclosure may further include that computation performed by the unassured user is a GPS position-velocity-time (PVT) technique. This exemplary embodiment or another exemplary of the present disclosure may further include that computation performed by the unassured user is a double differencing technique. This exemplary embodiment or another exemplary of the present disclosure may further include a step of extending communication to a second assured user, by the assured user, when at least one datalink obstruction is present. This exemplary embodiment or another exemplary of the present disclosure may further include a step of extending communication to a plurality of assured users, by the assured user, when at least one datalink obstruction is present.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
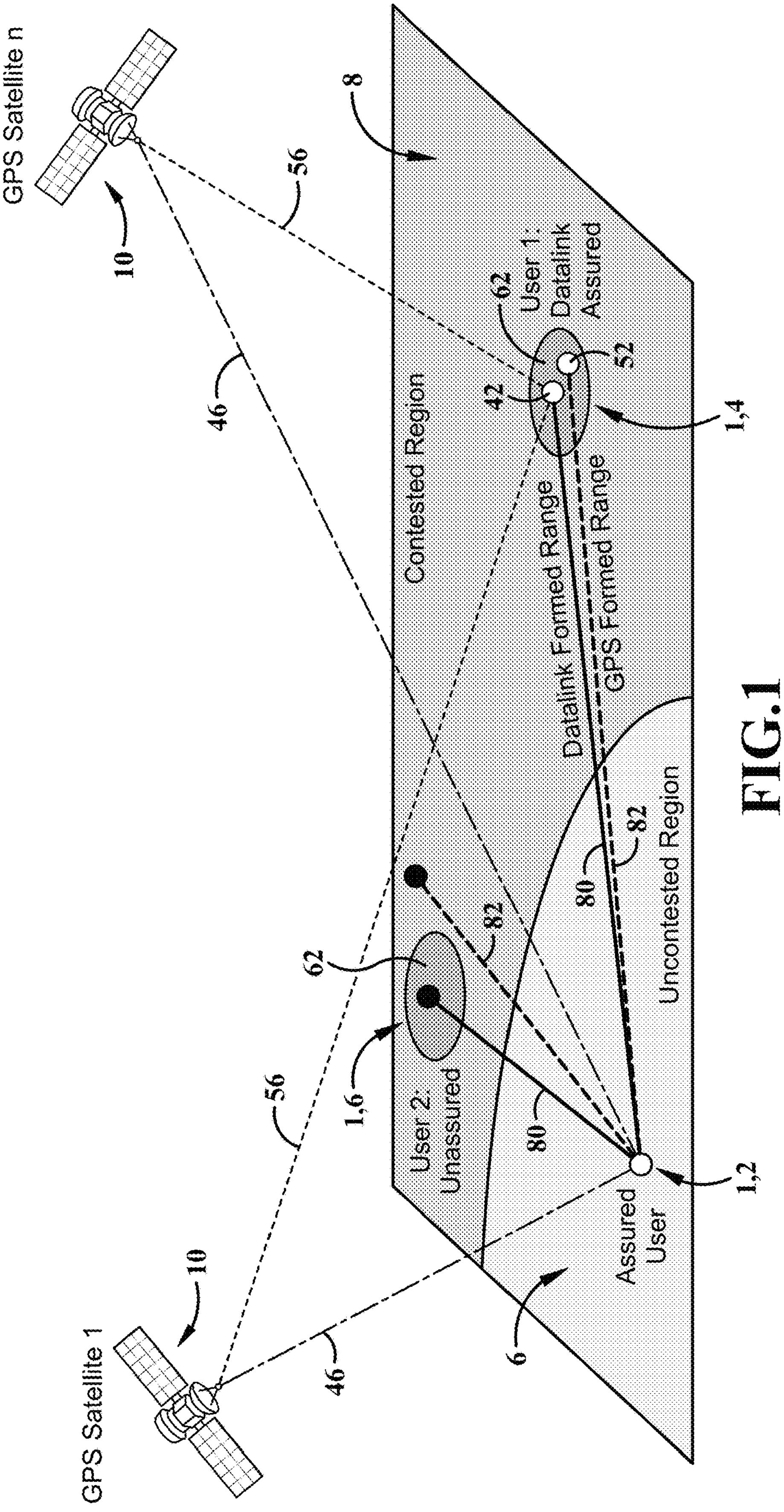
FIG. 1 is a diagrammatic view of a network system in accordance with one aspect of the present disclosure, the network system includes at least one or more users that are assured or unassured.

FIG. 1 illustrates a network system or assurance network 1 that is capable of having a plurality of users or devices to communicate with one another based on an assurance protocol installed with each user, which is discussed in greater detail below. Network system 1 may include one or more assured users 2 that are capable of communicating with one another upon meeting an assurance threshold set by the assured user 2. Network system 1 may also include one or more unassured users 4 that are incapable of communicating with the one or more assured users 2 by failing to meet an assurance threshold computed by the assured user 2. It should be understood, and will be discussed in greater detail below, that an unassured user may transition and/or change from an unassured state to an assured state if the user meets the assurance threshold included in the assurance protocol that is installed and/or loaded with said user.

Still referring to FIG. 1, regions or zones may also be present and used in network system 1 for distinguishing areas as being uncontested or contested. In the present disclosure, an uncontested or known region 6 may be used by network system 1 for encapsulating and/or distinguishing one or more assured users 2 in the network system 1. Additionally, a contested or unknown region 8 may also be used by network system for encapsulating and/or distinguishing one or more assured users 2 and one or more unassured users 4 in the network system 1. It should be understood that such use of uncontested region 6 and contested region 8 may be defined based on implementation of network system 1 in a particular environment. In one example, the uncontested region 6 may be defined as a known or safe area in the network system 1 while the contested region 8 may be defined as an unknown or unsafe area in the network system 1 if such network system 1 is used in a military setting or operation.

Network system 1 may also include one or more satellite vehicles (hereinafter "SV") generally referred to as 10. As discussed in greater detail below, one or more users (such as assured users 2 or unassured users 4) may access and communicate with SVs 10 for determining and computing global positions during assurance operations. In the present disclosure, two SVs 10 are disclosed herein and are to be utilized by at least two users (assured users 2 and/or unassured user 4) when an assurance operation is performed between the at least two users. In other exemplary embodiments, any suitable number of SVs may be utilized by two or more users of a network system when an assurance operation is performed between the users.

In the network system 1, each user of the network system 1 (both the assured users 2 and the unassured users 4) is equipped with a global positioning system (hereinafter "GPS") 20. In the present disclosure, GPS 20 is configured to communicate with one of the SVs 10 that is proximate to and/or near the GPS 20 of the user. Such communication between the GPS 20 and the SVs 10 of a specific user enables the user to calculate and determine the global position of the user as well as the global position of another user (either an assured user 2 or an unassured user 4). In the present disclosure, GPS 20 of each user of the network system 1 includes a GPS receiver for receiving global position information and/or measurements with respect to the global position of the user as well as the global position of another user (either an assured user 2 or an unassured user 4). GPS 20 of each user of the network system 1 also includes a GPS transceiver for sending and/or outputting global position information and/or measurements with respect to the global position of the user to another user (either an assured user 2 or an unassured user 4) for assurance purposes, which will be discussed in greater detail below.

Figure 2:
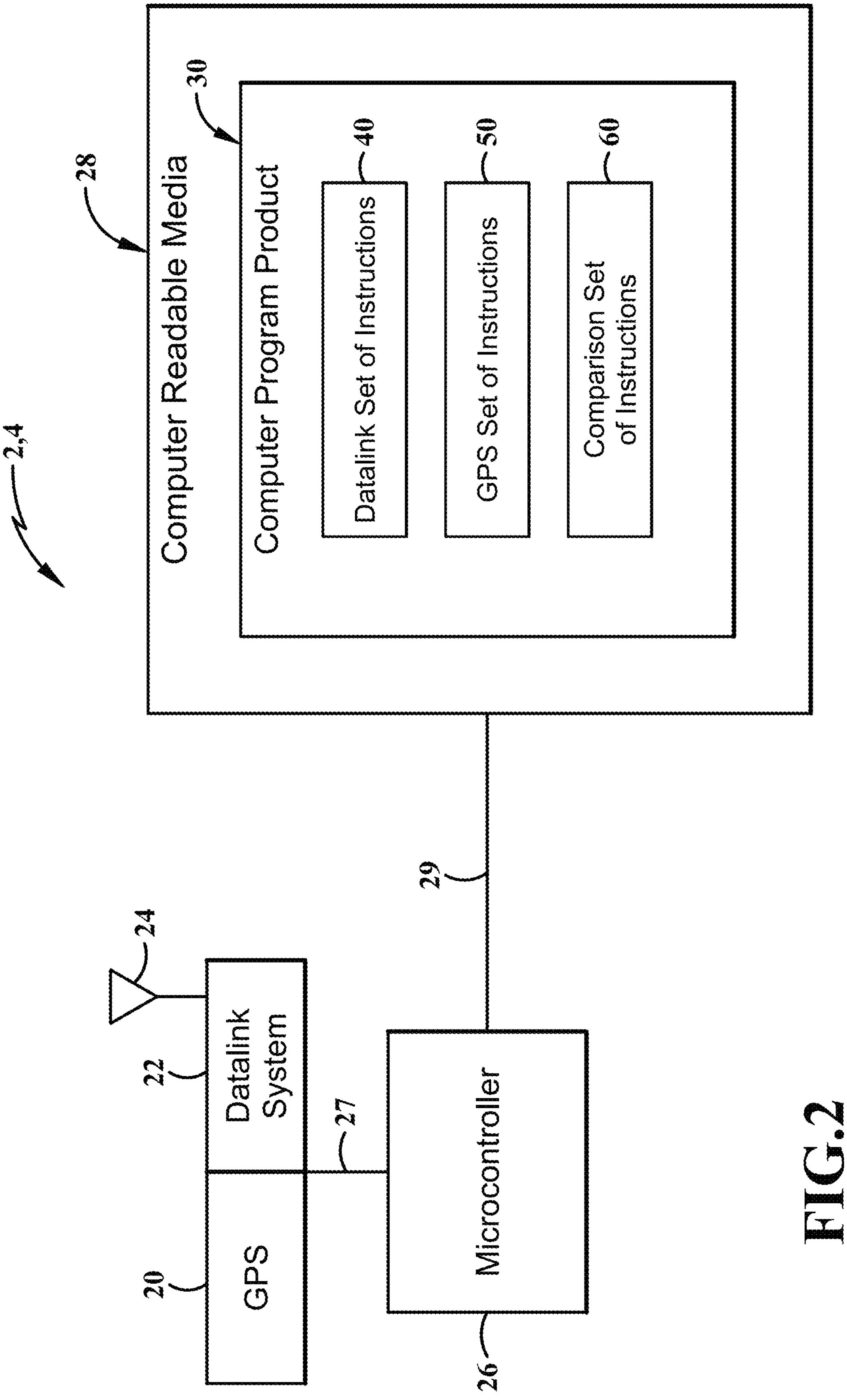
FIG. 2 is a block diagram of components and an assurance protocol installed with each user of the network system shown in FIG. 1.

In the network system 1, each user of the network system 1 (both the assured users 2 and the unassured users 4) is also equipped with a datalink system (hereinafter "datalink") 22 having an antenna 24 (as shown in FIG. 2). In the present disclosure, datalink 22 of each user of the network system 1 includes a datalink receiver that is configured to receive datalink messages from other users of the network system 1 for assurance operations; such datalink messages are received at the antenna 24. Datalink 22 of each user of the network system 1 also includes a datalink transceiver that is configured to send datalink messages to other users of the network system 1 for assurance operations; such datalink messages are also sent through the antenna 24 to transmit such datalink message to the other users of the network system 1. As discussed in greater detail below, each datalink message sent between users (both assured users 2 and unassured users 4) may include data or a measurement for tracking time at which each message is sent between the users.

In the network system 1, each user of the network system 1 (both the assured users 2 and the unassured users 4) is also equipped with a microcontroller 26. As best seen in FIG. 2, microcontroller 26 is capable of communicating with GPS 20 and datalink 22 for assurance operations via a first electrical connection 27. In one instance, the microcontroller 26 may communicate with GPS 20 to receive global positioning information and/or data about said user or about other users of the network system 1 that are in communication with said user. In this same instance, the microcontroller 26 may also communicate with GPS 20 to output or transmit global positioning information about said user to the other users of the network system 1. In another instance, the microcontroller 26 may communicate with datalink 22 to receive datalink messages from other users of the network system 1 that are in communication with said user. In this same instance, the microcontroller 26 may also communicate with datalink 22 to output datalink messages about said user to the other users of the network system 1. It should be noted that such communication between GPS 20 and microcontroller 26 and between datalink 22 and microcontroller 26 may be performed concurrently or be performed at different time intervals.

In the network system 1, each user of the network system 1 (both the assured users 2 and the unassured users 4) also includes a non-transitory computer or machine readable medium 28 that is in communication with the microcontroller 26. As best seen in FIG. 2, the microcontroller 26 and the computer readable medium 28 are in communication with one another via a second electrical connection 29 so that the microcontroller 26 may access computer readable medium 28 during assurance operations, which are discussed in greater detail below. In the present disclosure, computer readable medium 28 is loaded and/or installed with a computer program product or computer-implemented product that is accessible and executable by the microcontroller 26 for assuring one or more unassured users 4 to being assured users 2 in the network system 1.

As discussed previously, the computer readable medium 28 of each user of the network system 1 is loaded and/or installed with a computer program product, computer-implemented method, or assurance protocol 30 that is accessible and executable by the microcontroller 26. Upon accessing and executing the assurance protocol 30, microcontroller 26 of a specific user of the network system 1 is instructed or commanded to perform one or more sets of instructions of the assurance protocol 30 in order to transition one or more users from being unassured users 4 to being assured users 2 in the network system 1. Such sets of instructions of the assurance protocol 30 are now discussed in greater detail below.

In the present disclosure, users that are loaded and/or installed with assurance protocol 30 may communicate with one another upon establishing assurance between one another. As such, users that are not loaded and/or or installed with such assurance protocol 30 will fail to provide information and/or data that is necessary to establish assurance between one another. Such use of assurance protocol 30 is then considered advantageous at least because such acts of spoofing or similar cyber-attacks performed by hostile or adverse entities are thwarted and prevented for users that make up the network system 1.

With respect to assurance protocol 30, assurance protocol 30 includes a first set of instructions or datalink set of instructions 40 that is accessible and executable by the microcontroller 26. As best in FIG. 2A, the datalink set of instructions 40 includes a first step or instruction 40*a* that causes the microcontroller 26 to instruct the datalink transceiver of the datalink 22 of the unassured user 4 to output at least one unassured datalink message from an unassured user 4 to an assured user 2. Such unassured datalink message output from the datalink 22 of the unassured user 4 may include background information that is specific to the unassured user 4. In this first step 40*a*, it should be noted that the unassured user 4 initiates communication to an assured user 2 in order to transition from an unassured status to an assured status (i.e., become an assured user in network system 1).

Figure 2A:
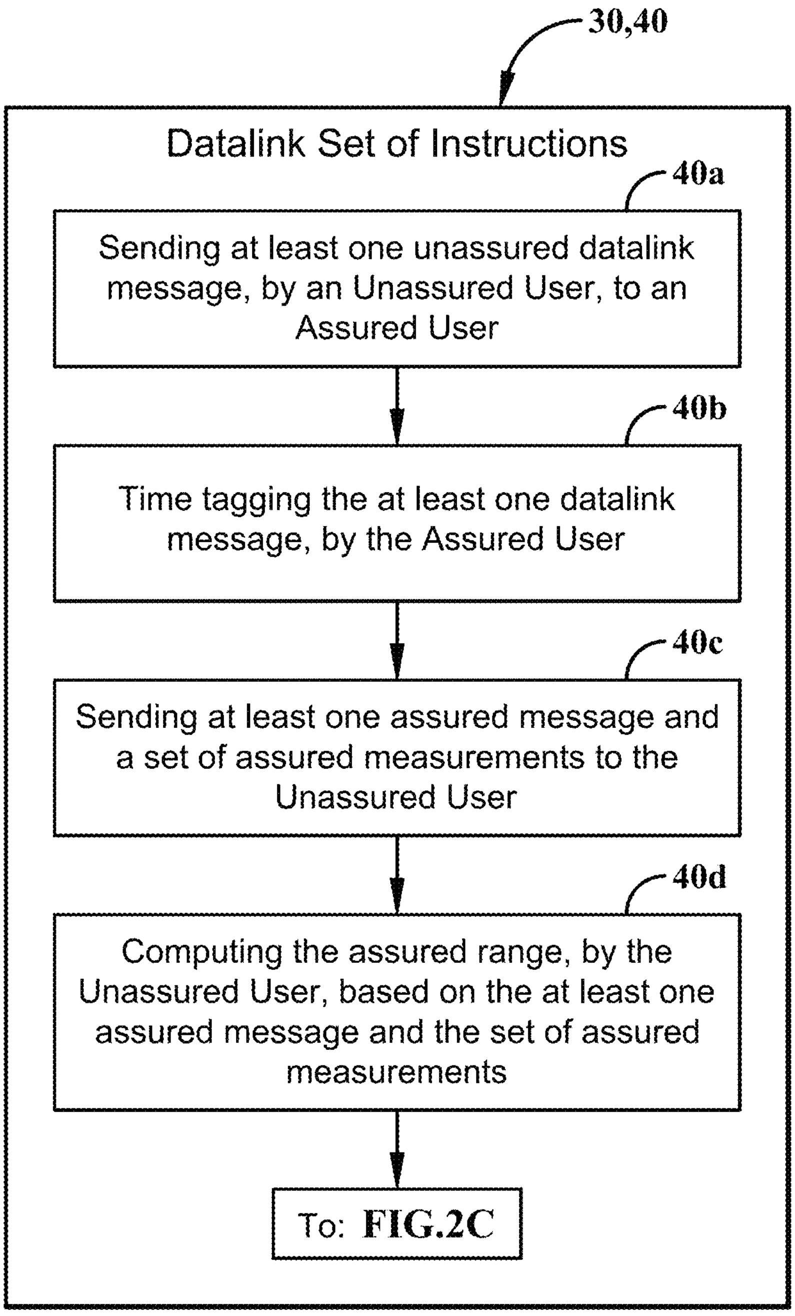
FIG. 2A is a flowchart depicting a datalink set of instructions for the assurance protocol shown in FIG. 2.

Still referring to FIG. 2A, the datalink set of instructions 40 includes a second step or instruction 40*b* that is performed subsequent to the first step 40*a*. Upon execution of the second step 40*b*, the microcontroller 26 is commanded to instruct the datalink receiver of the datalink 22 of the assured user 2 to time tag the at least one unassured datalink message from an unassured user 4 to an assured user 2. Such act of time tagging performed by the microcontroller 26 provides the assured user 2 with a first assurance datalink point or measurement about the unassured user 4 to be used in determining if the unassured user 4 transitions to an assured user 2 in the network system 1 or remains as an unassured user in the network system 1. Such first assurance datalink point of the unassured user 4 based on the datalink information is denoted by a circle labeled 44 in FIGS. 5-6. In this second step 40*b*, it should be noted that the assured user 2 executes second step 40*b* upon receiving the at least one unassured datalink message from the unassured user 4.

Still referring to FIG. 2A, the datalink set of instructions 40 includes a third step or instruction 40*c* that is performed subsequent to first and second steps 40*a*, 40*b*. Upon execution of the third step 40*c*, the microcontroller 26 of the assured user 2 is commanded to instruct the datalink transceiver of the datalink 22 of the assured user 2 to output at least one assured datalink message from assured user 2 to the respective unassured user 4 that initiated communication. Similar to the at least one unassured datalink message, the at least one assured datalink message output from the datalink 22 of the assured user 2 may include background information that is specific to the assured user 2 and be shown as a second assurance datalink point. Such second assurance datalink of the assured user 2 based on the datalink information is denoted by a circle labeled 42 in FIGS. 1 and 5-6.

Upon execution of the third step 40*c*, the microcontroller 26 of the assured user 2 is also commanded to instruct the GPS 20 of the assured user 2 to output a set of assured measurements from the assured user 2 to the unassured user 4. Such set of assured measurements is gathered and computed by the GPS 20 upon communication with at least one SV 10 that is proximate to the assured user 2. Such set of assured measurements provided by the assured user 2 are diagrammatically illustrated by dash-dot lines labeled 46 in FIG. 1. In this third step 40*c*, it should be noted that the assured user 2 executes third step 40*c* upon receiving the at least one unassured datalink message from the unassured user 4 and time tagging the at least one unassured datalink message.

Still referring to FIG. 2A, the datalink set of instructions 40 includes a fourth step or instruction 40*d* that is performed subsequent to first, second, and third steps 40*a*, 40*b*, 40*c*. Upon execution of the fourth step 40*d*, the microcontroller 26 of the unassured user 4 is commanded to compute the assured range of the assured user 2. Such computation performed by the microcontroller 26 of the unassured user 4 upon receiving the at least one assured message and the set of assured measurements sent from the assured user 2. In this fourth step 40*d*, it should be noted that the unassured user 4 executes fourth step 40*d* upon receiving the at least one unassured datalink message from the unassured user 4 and time tagging the at least one unassured datalink message.

Figure 2B:
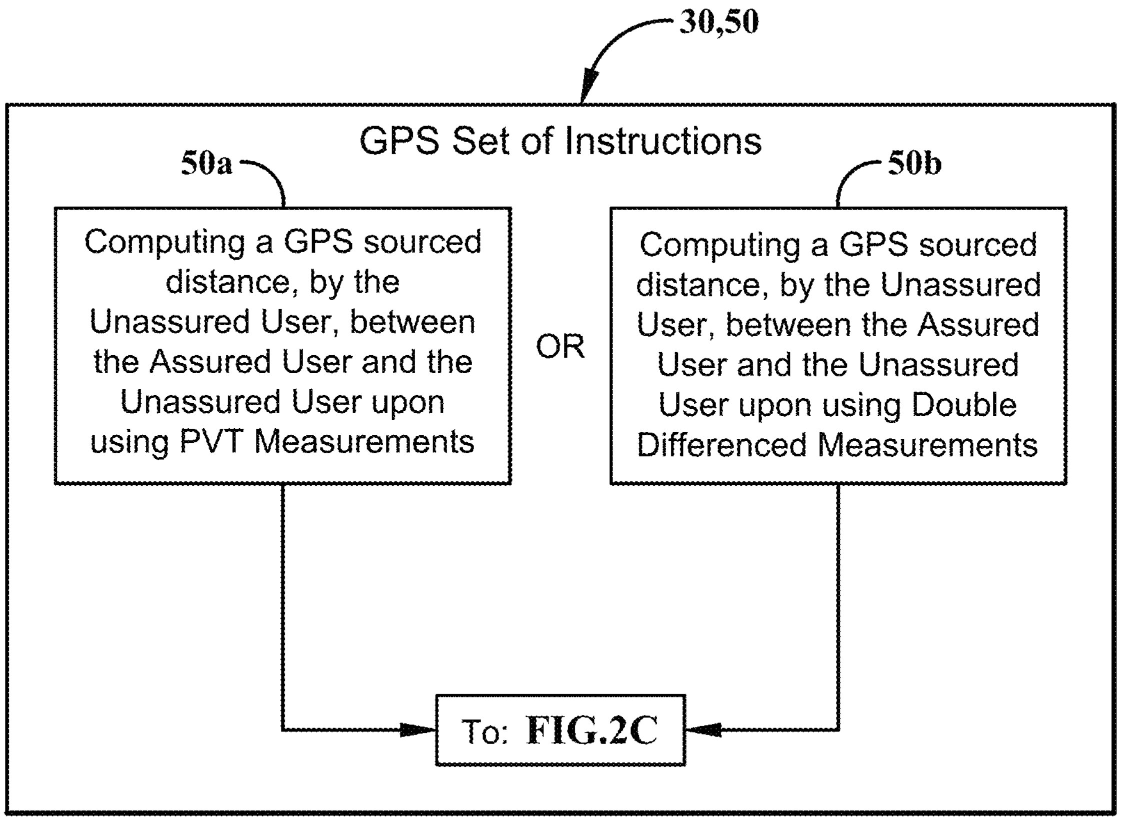
FIG. 2B is a flowchart depicting a global positioning system (GPS) set of instructions for the assurance protocol shown in FIG. 2.

Assurance protocol 30 also includes a second set of instructions or GPS set of instructions 50 that is accessible and executable by the microcontroller 26. As best in FIG. 2B, the GPS set of instructions 50 includes a first step or instruction 50*a* that causes the microcontroller 26 of the unassured user 4 to compute a GPS source distance between the assured user 2 and the unassured user 4. In this first step 50*a*, microcontroller 26 of the unassured user 4 computes GPS source distance between the assured user 2 and the unassured user 4 by differencing the set of assured measurements of the assured user 2 and a set of unassured measurements of the unassured user 4. Similar to the set of assured measurements of the assured user 2, the set of unassured measurements is gathered and computed by the GPS 20 of unassured user 4 upon communication with at least one SV 10 that is proximate to the unassured user 4. Such set of unassured measurements provided by the unassured user 2 are diagrammatically illustrated by dashed lines labeled 56 in FIG. 1. In this particular step 50*a*, the microcontroller 26 may use a GPS position-velocity-time (PVT) technique to compute and acquire the GPS source distance between the assured user 2 and the unassured user 4.

Optionally, the GPS set of instructions 50 may include a second step or instruction 50*b*. Similar to the first step 50*a*, the second step 50*b* also causes the microcontroller 26 of the unassured user 4 to compute a GPS source distance between the assured user 2 and the unassured user 4. In this second step 50*b*, microcontroller 26 of the unassured user 4 computes GPS source distance between the assured user 2 and the unassured user 4 by differencing the set of assured measurements of the assured user 2 and a set of unassured measurements of the unassured user 4. In this particular step 50*b*, the microcontroller 26 may use double differencing technique to compute and acquire the GPS source distance between the assured user 2 and the unassured user 4.

It should be noted that microcontroller 26 may utilize either the first step 50*a* or the second step 50*b* in order to compute the GPS source distance between the assured user 2 and the unassured user 4. In one example, the microcontroller 26 may use the first step 50*a* to compute the GPS source distance between the assured user 2 and the unassured user 4 for a quick solution. In another example, the microcontroller 26 may use the second step 50*b* to compute the GPS source distance between the assured user 2 and the unassured user 4 for a more accurate solution as compared to the GPS source distance computed in the first step 50*a*. It should also be understood that users of a network system may include one or both steps 50*a*, 50*b* depending on the situation and/or operation of the network system 1.

Assurance protocol 30 also includes a third set of instructions or confirmation set of instructions 60 that is accessible and executable by the microcontroller 26. As best in FIG. 2C, the confirmation set of instructions 60 includes a first step or instruction 60*a* that causes the microcontroller 26 of the assured user 2 to compare the assured datalink range, as computed in the datalink set of instructions 40, with the unassured GPS range. Such execution of the first step 60*a* by the microcontroller 26 of the assured user 2 occurs subsequent to the unassured user 4 completing the GPS set of instructions 50 and receiving the unassured GPS range from the unassured user 4. In this first step 60*a*, the microcontroller 26 of the assured user 2 computes the difference between the unassured datalink location 44 of the unassured user 4 (based on the assured datalink range computed in the datalink set of instructions 40) and an unassured GPS location 54 of the unassured user 4 (based on the unassured GPS range computed in the GPS set of instructions 50). Such computation performed by the microcontroller 26 of the assured user 2 provides a distance between the unassured datalink location 44 and the unassured GPS location 54; such distance is used in further steps of the confirmation set of instructions 60.

Figure 2C:
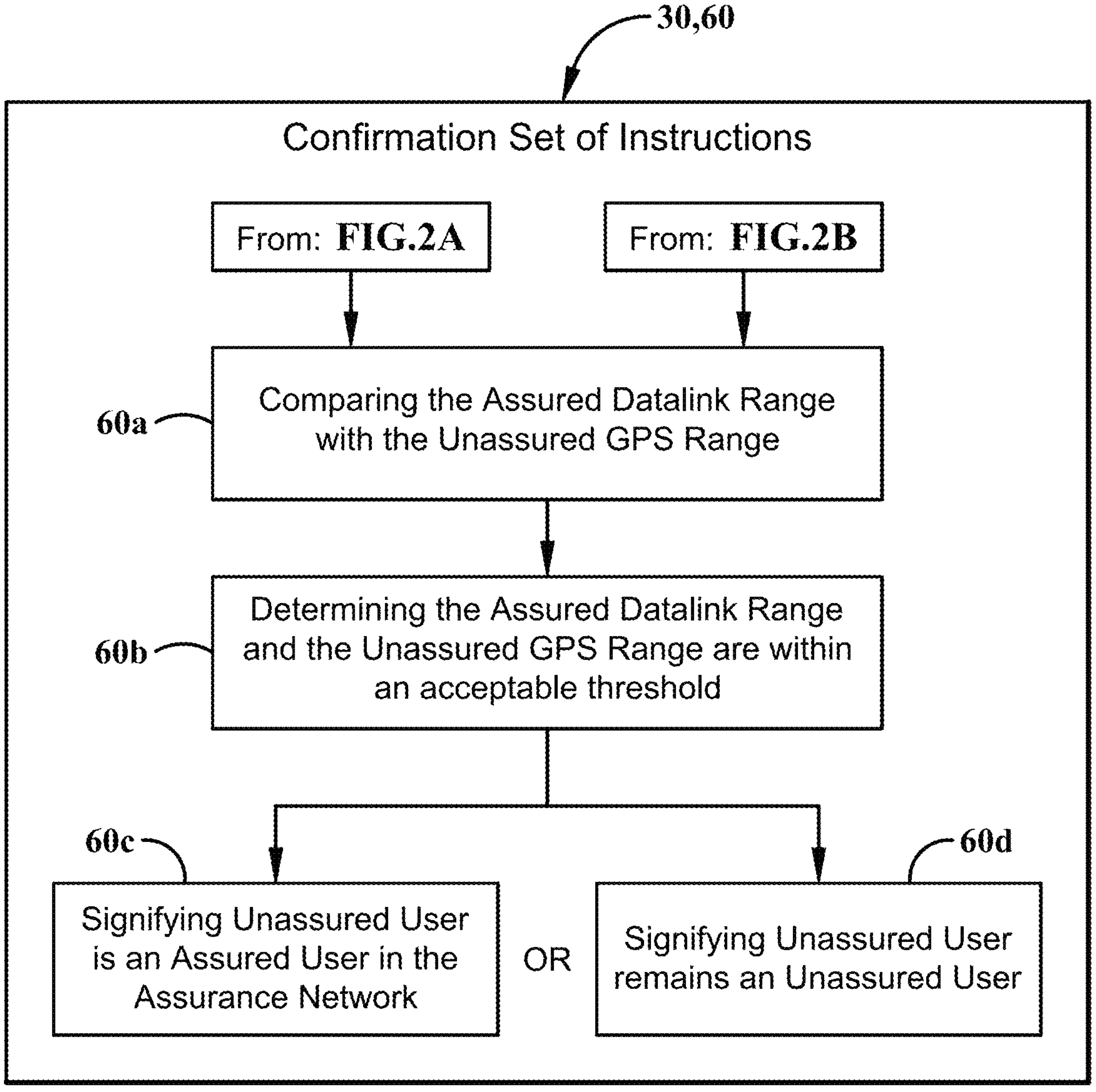
FIG. 2C is a flowchart depicting a confirmation set of instructions for the assurance protocol shown in FIG. 2.

Still referring to FIG. 2C, the confirmation set of instructions 60 includes a second step or instruction 60*b* that causes the microcontroller 26 of the assured user 2 to determine if the unassured datalink location 42 of the unassured user 4 (based on the assured datalink range computed in the datalink set of instructions 40) and the unassured GPS location 52 of the unassured user 4 (based on the unassured GPS range computed in the GPS set of instructions 50) are within an acceptable or confidence threshold defined in the assurance protocol 30. For illustrative purposes, the acceptable threshold of the assurance protocol 30 is denoted by a circle that is labeled 62 in FIGS. 1 and 5-6. In one instance, the acceptable threshold 62 may be defined as the radius of the circle shown in FIGS. 1 and 5-6. In another instance, the acceptable threshold 62 may be defined as the diameter of the circle shown in FIGS. 1 and 5-6. It should be understood that the acceptable threshold of the assurance protocol 30 is a set or predetermined distance encoded in the assurance protocol 30 to determine if the unassured user 4 may transition to an assured user based on the distance the unassured datalink location 44 of the unassured user 4A and the unassured GPS location 54 of the unassured user 4.

Figure 5:
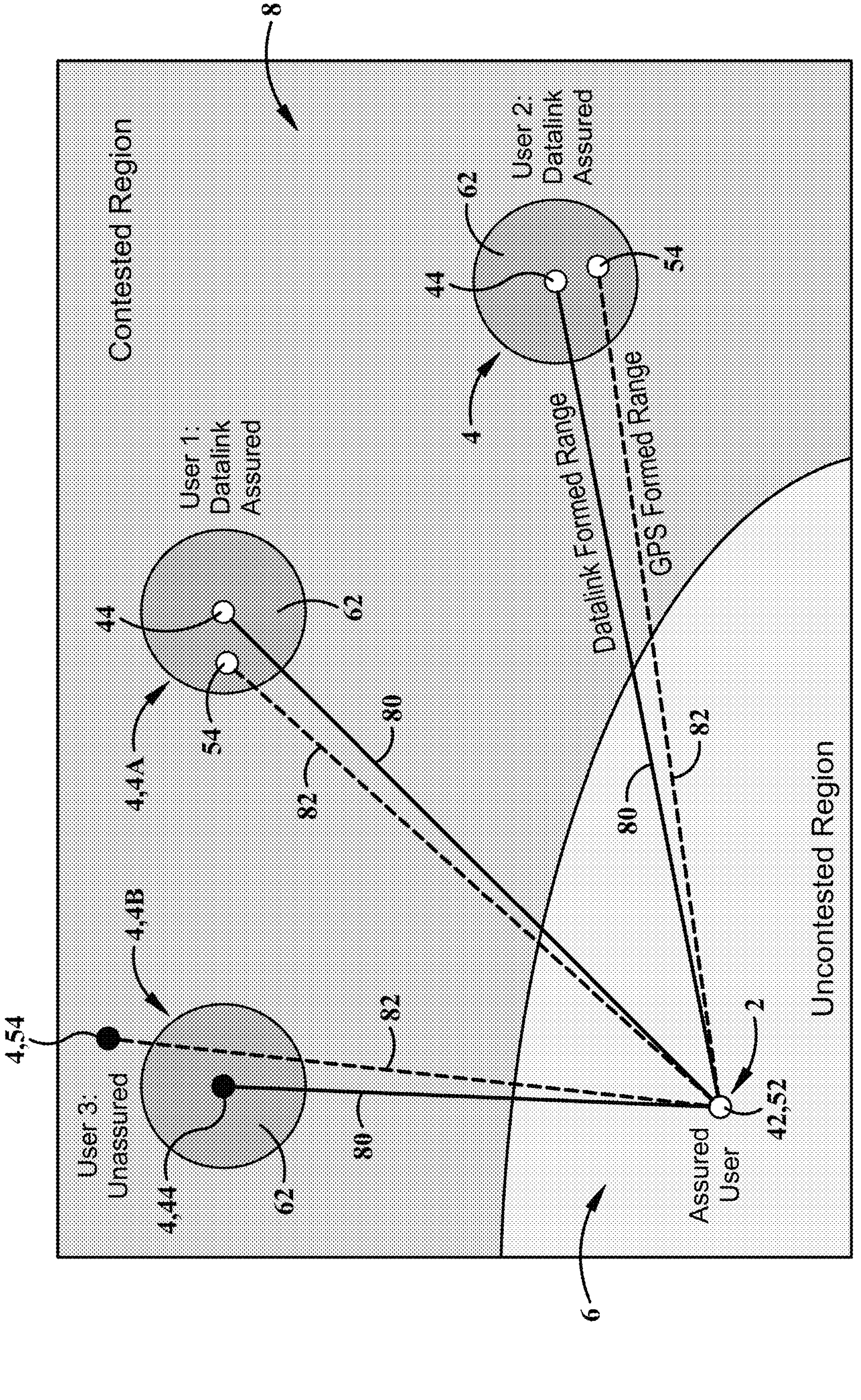
FIG. 5 is a diagrammatic view of the network system similar to FIG. 1, wherein an assured user determines whether one or more users are signified as assured or remain unassured.

In this confirmation set of instructions 60, the assurance threshold 62, as executed by the microcontroller 26, determines if the unassured user 4 may transition to an assured user (such as assured user 2) or shall/must remain as an unassured user. In one example, and as best seen in FIGS. 1 and 5, the unassured user 4 transitions to an assured user when the distance between the unassured datalink location 42 of the unassured user 4 and the unassured GPS location 52 of the unassured user 4 is less than the acceptable threshold 62. For illustrative purposes, the unassured datalink location 42 of the unassured user 4 and the unassured GPS location 52 of the unassured user 4 would be located inside of the assurance threshold 62. In this example, microcontroller 26 of the assured user 2 executes a third step of instruction 60*c* of the confirmation set of instructions 60 by signifying and/or designation that unassured user (such as unassured user 4A) is an assured user in the network system 1. With such execution of the third step 60*c*, the assured users 2, 4A may further communicate with one another even though user 4A is encapsulated in the contested region 8.

In another example, and as best seen in FIGS. 1 and 5, an unassured user 4 remains an unassured user when the distance between the unassured datalink location 42 of the unassured user 4 and the unassured GPS location 52 of the unassured user 4 is greater than the acceptable threshold 62. For illustrative purposes, at least one of the unassured datalink location 42 of the unassured user 4 or the unassured GPS location 52 of the unassured user 4 would be located outside of the assurance threshold 62. In this example, microcontroller 26 of the assured user 2 executes a fourth step of instruction 60*c* of the confirmation set of instructions 60 by signifying and/or designating that unassured user (such as unassured user 4B) remains as an unassured user in the network system 1. With such execution of the fourth step 60*d*, the assured user 2 ceases any further communication with the unassured user 4B.

Figure 6:
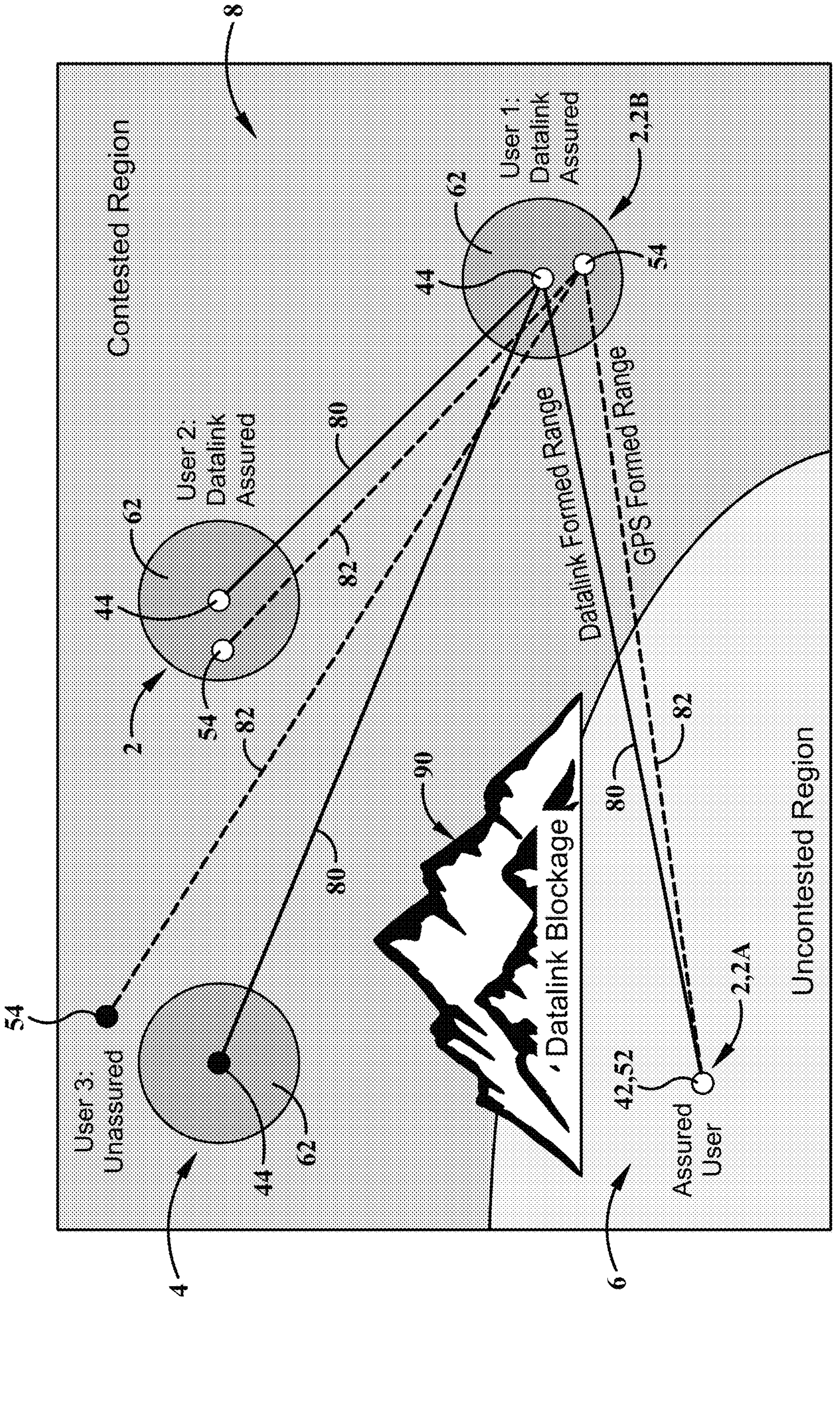
FIG. 6 is a diagrammatic view of a network system in accordance with another aspect of the present disclosure, the network system includes a first assured user that extends assurance capabilities to another assured user due to a datalink blockage.

In an alternative embodiment, an assured user of the network system 1 may extend an assurance capability (i.e., execution of assurance protocol 30) to one or more assured users of the network system 1 due to being impeded by various datalink obstacles. Examples of datalink obstacles that may obstruct assurance capabilities for an assured user include, but are not limited to, terrain, environment, weather conditions, and other obstacles that may obstruct assurance capabilities for an assured user. In one example, and as best seen in FIG. 6, a first assured user 2A of the network system 1 (that is encapsulated in the uncontested region 6) may extend assurance capabilities to a second assured user 2B of the network system 1 (that is encapsulated in the contested region 8) when an unassured user 4 attempts to communicate with second assured user 2B. Such extension of assurance capabilities from the first assured user 2A to the second assured user 2B is performed due to the first assured user 2A being unable to communicate with the unassured user 4 due to terrain obstacles (e.g., mountain range or similar terrain obstacle) impeding datalink communication. As such, the second assured user 2B may communicate with and execute the assurance protocol 30 to determine if such unassured user 4 should be signified as another assured user of the network system 1 or remain as unassured in the network system 1.

Having now described the components of network system 1 as well as the assurance protocol 30, a method of the using the assurance protocol 30 is now discussed in greater detail below.

Figure 3:
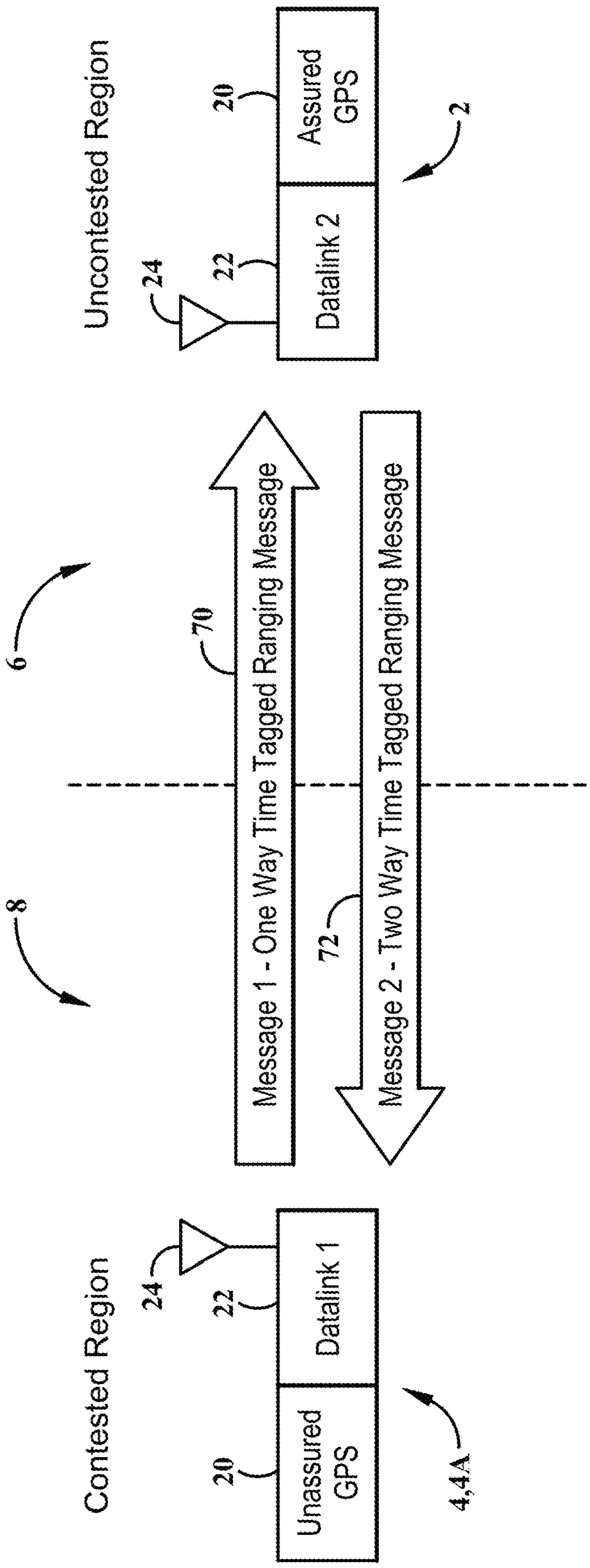
FIG. 3 is a diagrammatic view of an assured user and an unassured user communicating with one another to establish a datalink range between both the assured user and unassured user.

Initially, a unassured user (e.g., unassured user 4A) initially outputs a message to the assured user 2 in order to establish communication with the assured user 2. As best seen in FIG. 3, the unassured user 4A may send a first message or unassured message 70 to the assured user 2 that is encapsulated inside of the uncontested region 6. Such action of sending the first message 70 occurs due to the microcontroller 26 of the unassured user 4A accessing and executing the first step 40*a* of the datalink set of instructions 40. In this first message 70, the unassured user 4A includes a first or unassured datalink range that is specific to the unassured user 4A.

Upon receiving such first message 70, the assured user 2 may then initiate the assurance protocol 30 to establish if the unassured user 4A transitions to an assured status or remains at the unassured status. Particularly, microcontroller 26 of the assured user 2 access the assurance protocol 30 and executes the datalink set of instructions 40. At this stage, the microcontroller 26 is instructed to time tag the first message 70 upon receiving said first message 70 from the unassured user 4A (second step 40*b*). Such time tagging performed by the microcontroller 26 helps establish a first assured or assured datalink range 80 between the assured user 2 and the unassured user 4A for assurance computation.

Once the first message 70 is time tagged, the assured user 2 may then access and perform third step 40*c* of the datalink set of instructions 40 by sending a second message or assured message 72 to the unassured user 4A. In this second message 72, the assured user 2 includes a second or assured datalink range that is specific to the assured user 2. In this second message 72, the assured user 2 also includes a set of assured measurements or an assured position that provides a global location or position of the assured user 2. Such set of assured measurements or an assured position may be computed based on communication between a SV (such as first SV 10A) that is proximate to the assured user 2.

Once the second message 72 is received by the unassured user 4A, the unassured user 4A may then access and perform the fourth step 40*d* of the datalink set of instructions 40. At this stage, the unassured user 4A computes the assured datalink range 80 by differencing the unassured datalink of the unassured user 4A and the assured datalink of the assured user 2. For diagrammatic purposes, the assured datalink range 80 that is computed and established between the assured user 2 and the unassured user 4A is denoted by a solid line labeled 80 in FIG. 4 that connects between the antennas 24 of the datalink systems 22 of the assured user 2 and the unassured user 4A. With respect to FIGS. 1 and 5-6, such positions of the assured user 2 and the unassured user 4A computed upon executing the datalink set of instructions 40 are diagrammatically shown as circles where the assured datalink location of the assured user 2 is labeled 42 while the unassured datalink location of the unassured user 4A is labeled 44.

Concurrently or subsequent to establishing the assured datalink range 80, the unassured user 4A may then perform the GPS set of instructions 50 based on the assured position sent from the assured user 2 in the second message 72. At this stage, the unassured user 4A may then access and execute the first step 50*a* of the GPS set of instructions 50 or the second step 50*b* of the GPS set of instructions 50 to compute and establish an unassured GPS range 82 between the assured user 2 and the unassured user 4A. As stated previously, one of these steps 50*a*, 50*b* may be included in assurance protocol 30 dictated by the implementation of the assurance protocol 30 in network system 1. In one instance, first step 50*a* may be accessed and executed by the unassured user 4A for quickly computing an unassured GPS range 82 between the assured user 2 and the unassured user 4A; such execution of first step 50*a* may be less accurate than the second step 40*b* due to the simple calculation between the assured and unassured locations of the assured and unassured users 4A. In another instance, second step 50*b* may be accessed and executed by the unassured user 4A for accurately computing an unassured GPS range 82 between the assured user 2 and the unassured user 4A; such execution of second step 50*b* may require a greater amount of computation time than the second step 40*b* due to the thorough calculation between the assured and unassured locations of the assured and unassured users 4A.

Figure 4:
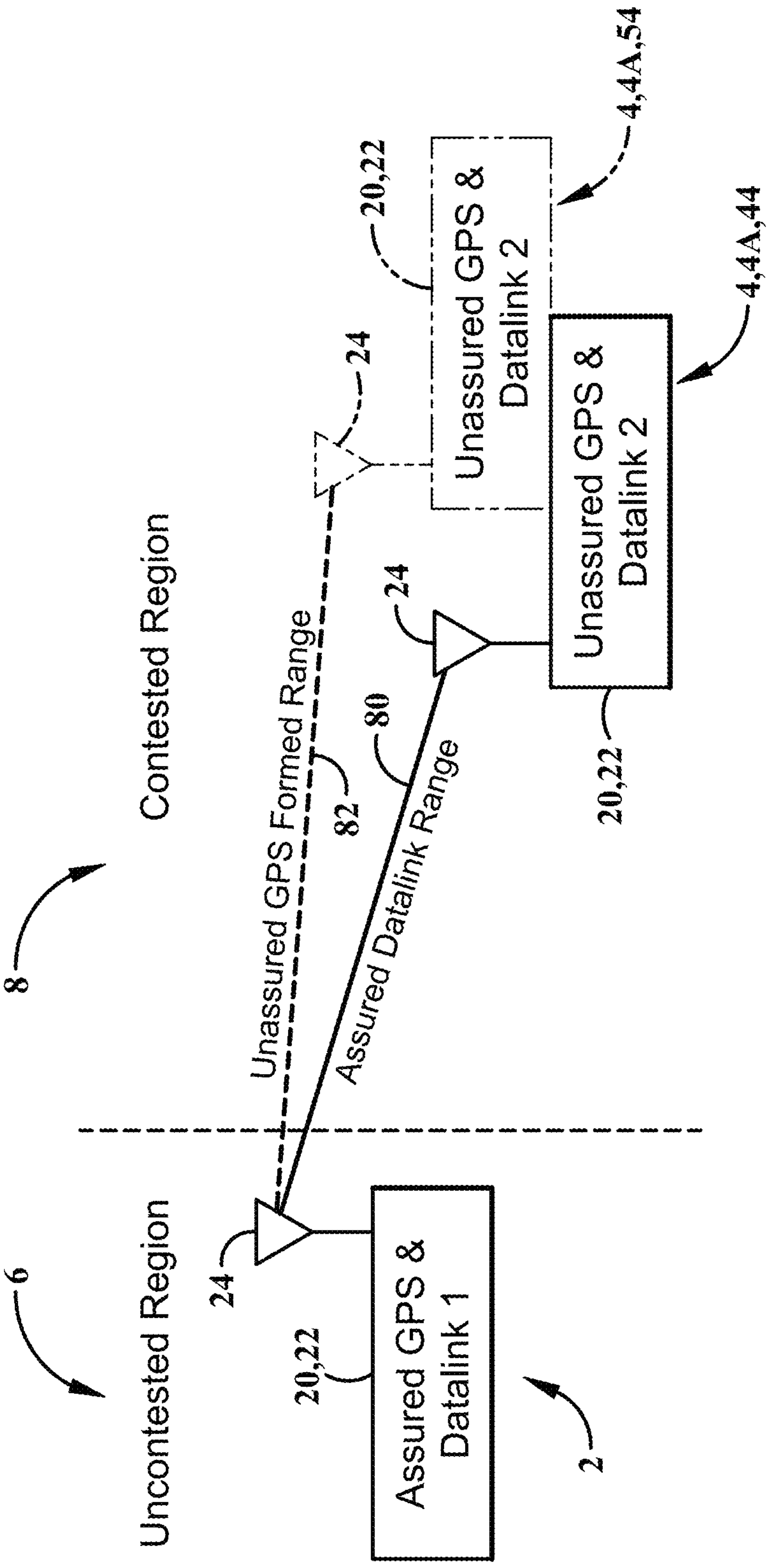
FIG. 4 is another diagrammatic view of the assured user and the unassured user communicating with one another to establish both the datalink range and an unassured GPS range between both the assured user and unassured user.

For diagrammatic purposes, the unassured GPS range 82 that is computed and established between the assured user 2 and the unassured user 4A is denoted by a dashed line labeled 82 that connects the GPS systems 20 of the assured user 2 and the unassured user 4A (see FIG. 4). With respect to FIGS. 1 and 5-6, such positions of the assured user 2 and the unassured user 4A computed upon executing the GPS set of instructions 50 are also diagrammatically shown as circles where an assured GPS location of the assured user 2 is labeled 52 while the unassured GPS location of the unassured user 4A is labeled 54. Once the unassured GPS range 82 is established, such data is then sent to the assured user 2 to confirm if unassured user 4A transitions to an assured state or remains at the unassured state.

Upon establishing the assured datalink range 80 and receiving the unassured GPS range 82 from the unassured user 4A, the assured user 2 then accesses and executes the confirmation set of instructions 60 to determine if unassured user 4A transitions to an assured state or remains at the unassured state. Initially, assured user 2 performs first step 60*a* of by comparing the assured datalink range 80 and the unassured GPS range 82 with one another through simply differencing computation. Upon such completion, assured user 2 then determines if the difference between the assured datalink range 80 and the unassured GPS range 82 is within the assurance threshold 62 to signify if the unassured user 4A transitions to an assured state or remains at the unassured state. If the difference is less than or inside of the acceptable threshold 62 as defined in assurance protocol 30, the assured user 2 changes the status of user 4A from an unassured state to an assured state; with such designation, the assured users 2, 4A may maintain communicate with one another in network system 1. If the difference is greater than or outside of the acceptable threshold 62 as defined in assurance protocol 30, the assured user 2 retains the status of being unassured (see unassured user 4B in FIGS. 1 and 5-6); with such designation, the assured users 2 will no longer communicate with user 4 in network system 1.

It should be noted that retaining a user at the unassured status occurs due to the user not being a part of or being installed with the assurance protocol 30 for establishing assurance in the network system 1. As such, the user remain unassured status since these users may be hostile, adverse, or unknown to other assured users for communication purposes. Such unassured designation may prevent and thwart spoofing or other hostile cyber interactions against assured users 2 as well as potentially allowing non-specific or known devices into the network system 1 for various reasons.

In an alternative embodiment, a first assured user of network system 1 that is encapsulated in the uncontested region 6 may extend assurance capabilities to a second assured user of the network system 1 that is encapsulated in the contested region 8 when communication issues arise for first assured user. As best seen in FIG. 6, a first assured user 2A may extend assurance capabilities to a second assured user 2B when the first assured user 2A is unable to communicate with one or more unassured users 4 due to communication obstacles. In this embodiment, a physical obstruction 90 near the first assured user 2A may block or obstruct datalink communication between the first assured user 2A and the unassured user 4. To avoid this obstruction, first assured user 2A may extend assurance capabilities to the second assured user 2B to determine and designate the unassured user 4 at an assured status or maintain said user 4 at the unassured status upon accessing and executing the assurance protocol 30 with user 4.

Figure 7:
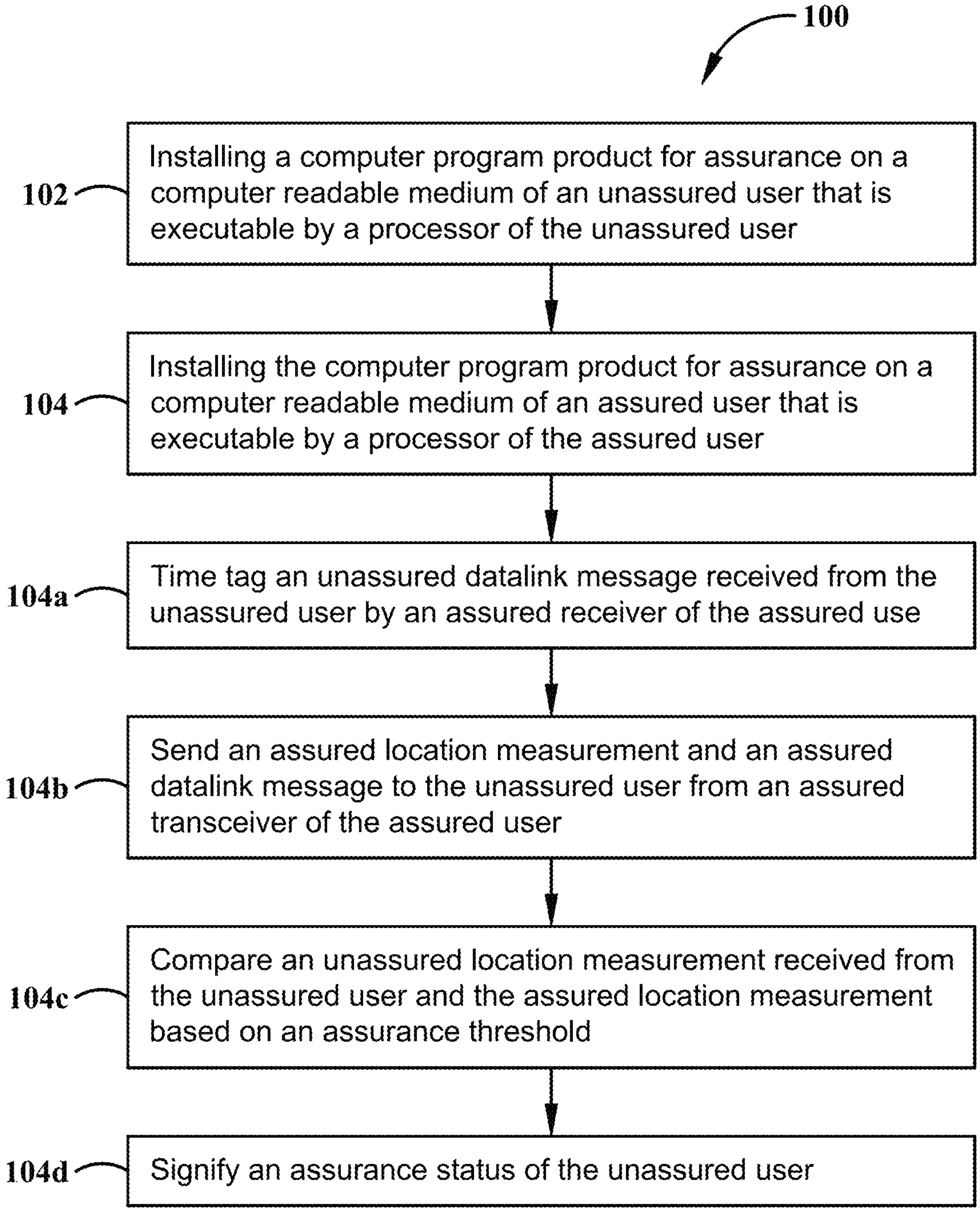
FIG. 7 is a flowchart of an exemplary method according to one aspect of the present disclosure.

FIG. 7 illustrates a method 100 of signifying an assurance status of an unassured user provided in a contested region. An initial step 102 of method 100 includes installing a computer program product for assurance on a computer readable medium of an unassured user that is executable by a processor of the unassured user. Another step 104 of method 100 includes installing the computer program product for assurance on a computer readable medium of an assured user that is executable by a processor of the assured user which, when executed by the processor, causes the processor to: time tag an unassured datalink message received from the unassured user by an assured receiver of the assured user (step 104*a*); send an assured location measurement and an assured datalink message to the unassured user from an assured transceiver of the assured user (step 104*b*); compare an unassured location measurement received from the unassured user and the assured location measurement based on an assurance threshold (step 104*c*); and signify an assurance status of the unassured user (step 104*d*).

In other exemplary embodiments, any additional or optional steps may be further included with method 100 to signify an assurance status of an unassured user provided in a contested region. In one exemplary embodiment, method 100 may further include that when a difference between the unassured location measurement and the assured location measurement is less the assurance threshold, the unassured user is signified as assured. In another exemplary embodiment, method 100 may further include that when a difference between the unassured location measurement and the assured location measurement is greater the assurance threshold, the unassured user is signified as unassured. In another exemplary embodiment, method 100 may further include a step of computing a global positioning system (GPS) sourced distance between the assured location measurement and the unassured location measurement by the processor of the unassured user. In another exemplary embodiment, method 100 may further include that computation performed by the unassured user is a GPS position-velocity-time (PVT) technique. In another exemplary embodiment, method 100 may further include that computation performed by the unassured user is a double differencing technique. In another exemplary embodiment, method 100 may further include a step of extending communication to a second assured user, by the assured user, when at least one datalink obstruction is present. In another exemplary embodiment, method 100 may further include a step extending communication to a plurality of assured users, by the assured user, when at least one datalink obstruction is present.

The device, assembly, or system of the present disclosure may additionally include one or more sensors to sense or gather data pertaining to the surrounding environment or operation of the device, assembly, or system. Some exemplary sensors capable of being electronically coupled with the device, assembly, or system of the present disclosure (either directly connected to the device, assembly, or system of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

In a particular embodiment, the device, assembly, or system of the present disclosure can use the sensors to acquire a representation of the real-world environment (e.g., a physical environment) at a given point in time. Data from these sensors may be used to generate a representation of a scene or scenario, which may then be used to teach a sensor model. For example, a representation of a scene can be derived from sensor data, properties of objects in the scene or surrounding environment such as positions or dimensions (e.g., depth maps), classification data identifying objects in the scene or surrounding environment, properties or classification data of components of the device, assembly, or system of the present disclosure, or some combination thereof. Generally, the sensor model learns to predict sensor data from a representation of the scene, environment or operation of the device, assembly, or system of the present disclosure.

The sensor model architecture can be selected to fit the shape of the desired input and output data. Examples of architectures (e.g., DNNs) include, but are not limited to, perceptron, feed-forward, radial basis, deep feed-forward, recurrent, long/short term memory, gated recurrent unit, autoencoder, variational autoencoder, convolutional, deconvolutional, and generative adversarial. Some DNN architectures, such as a GAN, can include a convolutional neural network (CNN) that accepts and evaluates an input image and may include multiple input channels, which may be used to accept and evaluate multiple input images and/or input vectors.

In one embodiment, training data for the sensor model may be generated using real-world (e.g., physical environment) data. To collect real-world training data, the device, assembly, or system of the present disclosure may collect sensor data by fusing sensors as the vehicle traverses a real-world environment. The sensors of the device, assembly, or system of the present disclosure may include, for example, one or more global navigation satellite systems sensors (e.g., Global Positioning System sensors (GPS)), RADAR sensors, ultrasonic sensors, LIDAR sensors, inertial measurement unit (IMU) sensors (e.g., accelerometer(s), gyroscope(s), magnetic compass(es), magnetometer(s), etc.), ego-motion sensors, microphones, stereo cameras, wide-view cameras (e.g., fisheye cameras), infrared cameras, surround cameras (e.g., 360 degree cameras), long-range and/or mid-range cameras, speed sensors (e.g., for measuring the speed of the vehicle), vibration sensors, steering sensors, brake sensors (e.g., as part of the brake sensor system), and/or other sensor types.

In another embodiment, training data for the sensor model is generated based on simulated or virtual environments. The training data may then be used to train the sensor model for use in real-world autonomous applications, e.g., to control the operation of the device, assembly, or system of the present disclosure. The training data may be derived to fit the shape of the input and output data for the sensor model, which may depend on the architecture of the sensor model. For example, sensor data may be used to encode an input scene, input parameters, and/or ground truth sensor data using different data structures and/or channels (e.g., concatenated vectors, matrices, tensors, images, etc.).

The device, assembly, or system of the present disclosure may include hardware, software and/or firmware responsible for managing the sensor data generated by the sensors. The autonomous hardware, software, and/or firmware being executed may manage different environments using one or more maps (e.g., 3D maps), positioning component(s), and the like. The autonomous hardware, software, and/or firmware may also include components to plan, control, and generally manage the device, assembly, or system of the present disclosure. In one example, the autonomous hardware, software, and/or firmware can be installed in and used to control the device, assembly, or system of the present disclosure through the environment based on the sensor data, one or more machine learning models (e.g., neural networks), and the like. A training system may use the training data to train the sensor model to predict virtual sensor data for a given scene, environment, or operation of a component.

The training system can include one or more servers (e.g., a graphics processing unit server) and data stores and may use a cloud-based deep learning infrastructure with artificial intelligence to analyze the sensor data received from the device, assembly, or system of the present disclosure and/or stored in the data store. The training system can also incorporate or train up-to-date, real-time neural networks (and/or other machine learning models) for one or more sensor models.

The device, assembly, or system of the present disclosure may include wireless communication logic coupled to sensors on the device, assembly, or system. The sensors gather data and provide the data to the wireless communication logic. Then, the wireless communication logic may transmit the data gathered from the sensors to a remote device. Thus, the wireless communication logic may be part of a broader communication system, in which one or several devices, assemblies, or systems of the present disclosure may be networked together to report alerts and, more generally, to be accessed and controlled remotely. Depending on the types of transceivers installed in the device, assembly, or system of the present disclosure, the system may use a variety of protocols (e.g., Wi-Fi®, ZigBee®, MIWI, BLUETOOTH®) for communication. In one example, each of the devices, assemblies, or systems of the present disclosure may have its own IP address and may communicate directly with a router or gateway. This would typically be the case if the communication protocol is Wi-Fi®. (Wi-Fi® is a registered trademark of Wi-Fi Alliance of Austin, TX, USA; ZigBee® is a registered trademark of ZigBee Alliance of Davis, CA, USA; and BLUETOOTH® is a registered trademark of Bluetooth Sig, Inc. of Kirkland, WA, USA).

In another example, a point-to-point communication protocol like MiWi or ZigBee® is used. One or more of the device, assembly, or system of the present disclosure may serve as a repeater, or the devices, assemblies, or systems of the present disclosure may be connected together in a mesh network to relay signals from one device, assembly, or system to the next. However, the individual device, assembly, or system in this scheme typically would not have IP addresses of their own. Instead, one or more of the devices, assemblies, or system of the present disclosure communicates with a repeater that does have an IP address, or another type of address, identifier, or credential needed to communicate with an outside network. The repeater communicates with the router or gateway.

In either communication scheme, the router or gateway communicates with a communication network, such as the Internet, although in some embodiments, the communication network may be a private network that uses transmission control protocol/internet protocol (TCP/IP) and other common Internet protocols but does not interface with the broader Internet, or does so only selectively through a firewall.

The system that receives and processes signals from the device, assembly, or system of the present disclosure may differ from embodiment to embodiment. In one embodiment, alerts and signals from the device, assembly, or system of the present disclosure are sent through an e-mail or simple message service (SMS; text message) gateway so that they can be sent as e-mails or SMS text messages to a remote device, such as a smartphone, laptop, or tablet computer, monitored by a responsible individual, group of individuals, or department, such as a maintenance department. Thus, if a particular device, assembly, or system of the present disclosure creates an alert because of a data point gathered by one or more sensors, that alert can be sent, in e-mail or SMS form, directly to the individual responsible for fixing it. Of course, e-mail and SMS are only two examples of communication methods that may be used; in other embodiments, different forms of communication may be used.

In other embodiments, alerts and other data from the sensors on the device, assembly, or system of the present disclosure may also be sent to a work tracking system that allows the individual, or the organization for which he or she works, to track the status of the various alerts that are received, to schedule particular workers to repair a particular device, assembly, or system of the present disclosure, and to track the status of those repair jobs. A work tracking system would typically be a server, such as a Web server, which provides an interface individuals and organizations can use, typically through the communication network. In addition to its work tracking functions, the work tracker may allow broader data logging and analysis functions. For example, operational data may be calculated from the data collected by the sensors on the device, assembly, or system of the present disclosure, and the system may be able to provide aggregate machine operational data for a device, assembly, or system of the present disclosure or group of devices, assemblies, or systems of the present disclosure.

The system also allows individuals to access the device, assembly, or system of the present disclosure for configuration and diagnostic purposes. In that case, the individual processors or microcontrollers of the device, assembly, or system of the present disclosure may be configured to act as Web servers that use a protocol like hypertext transfer protocol (HTTP) to provide an online interface that can be used to configure the device, assembly, or system. In some embodiments, the systems may be used to configure several devices, assemblies, or systems of the present disclosure at once. For example, if several devices, assemblies, or systems are of the same model and are in similar locations in the same location, it may not be necessary to configure the devices, assemblies, or systems individually. Instead, an individual may provide configuration information, including baseline operational parameters, for several devices, assemblies, or systems at once.

As described herein, aspects of the present disclosure may include one or more electrical or other similar secondary components and/or systems therein. The present disclosure is therefore contemplated and will be understood to include any necessary operational components thereof. For example, electrical components will be understood to include any suitable and necessary wiring, fuses, or the like for normal operation thereof.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, firmware or a combination thereof. When implemented in software, the software code or instructions can be executed on any suitable processor or collection of processors, whether provided in a single computer or distributed among multiple computers or in firmware. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A computer program product having instructions stored on a non-transitory machine-readable medium of each assured user of a network system and is executable by a processor of the assured user that, when executed by the processor, causes a process to be carried out for signifying assurance of an unassured user, the instructions of the computer program product comprising:

command an assured receiver of the assured user to time tag an unassured datalink message received from the unassured user;

command an assured transceiver of the assured user to send an assured location measurement and an assured datalink message to the unassured user;

command the assured receiver of the assured user to compare an unassured location measurement received from the unassured user and the assured location measurement based on an assurance threshold; and command the assured transceiver of the assured user to signify an assurance status of the unassured user, wherein signifying an assured status allows communication between the unassured user and one or more assured users of the network system.

2. The computer program product of claim 1, wherein the unassured user is signified as assured when a difference between the unassured location measurement and the assured location measurement is less the assurance threshold.

3. The computer program product of claim 1, wherein the unassured user is signified as unassured when a difference between the unassured location measurement and the assured location measurement is greater the assurance threshold.

4. The computer program product of claim 1, further comprising:

command the unassured user to compute a global positioning system (GPS) sourced distance between the assured location measurement and the unassured location measurement.

5. The computer program product of claim 4, wherein computation performed by the unassured user is a GPS position-velocity-time (PVT) technique.

6. The computer program product of claim 4, wherein computation performed by the unassured user is a double differencing technique.

7. A computer program product having instructions stored on a non-transitory machine-readable medium of each assured user of a network system and is executable by a processor of the assured user that, when executed by the processor, causes a process to be carried out for signifying assurance of an unassured user, the instructions of the computer program product comprising:

command an assured transceiver of the assured user to extend communication to a second assured user;

command an assured receiver of the second assured user to time tag an unassured datalink message received from the unassured user;

command an assured transceiver of the second assured user to send an assured location measurement and an assured datalink message to the unassured user;

command the assured receiver of the second assured user to compare an unassured location measurement received from the unassured user and the assured location measurement based on an assurance threshold; and command the assured transceiver of the second assured user to signify an assurance status of the unassured user, wherein signifying an assured status allows communication between the unassured user and one or more assured users of the network system.

8. The computer program product of claim 7, wherein the unassured user is signified as assured when a difference between the unassured location measurement and the assured location measurement is less the assurance threshold.

9. The computer program product of claim 7, wherein the unassured user is signified as unassured when a difference between the unassured location measurement and the assured location measurement is greater the assurance threshold.

10. The computer program product of claim 7, further comprising:

command the unassured user to compute a global positioning system (GPS) sourced distance between the assured location measurement and the unassured location measurement.

11. The computer program product of claim 10, wherein computation performed by the unassured user is a GPS position-velocity-time (PVT) technique.

12. The computer program product of claim 10, wherein computation performed by the unassured user is a double differencing technique.

13. A method of signifying an assurance status of an unassured user provided in a contested region, the method comprising:

installing a computer program product for assurance on a computer readable medium of an unassured user that is executable by a processor of the unassured user;

installing the computer program product for assurance on a computer readable medium of an assured user that is executable by a processor of the assured user, wherein the computer program product, when executed by the processor, causes the processor to:

time tag an unassured datalink message received from the unassured user by an assured receiver of the assured user;

send an assured location measurement and an assured datalink message to the unassured user from an assured transceiver of the assured user;

compare an unassured location measurement received from the unassured user and the assured location measurement based on an assurance threshold; and signify an assurance status of the unassured user, wherein signifying an assured status allows communication between the unassured user and one or more assured users of the network system.

14. The method of claim 13, wherein when a difference between the unassured location measurement and the assured location measurement is less the assurance threshold, the unassured user is signified as assured.

15. The method of claim 13, wherein when a difference between the unassured location measurement and the assured location measurement is greater the assurance threshold, the unassured user is signified as unassured.

16. The method of claim 13, further comprising:

computing a global positioning system (GPS) sourced distance between the assured location measurement and the unassured location measurement by the processor of the unassured user.

17. The method of claim 16, wherein computation performed by the unassured user is a GPS position-velocity-time (PVT) technique.

18. The method of claim 16, wherein computation performed by the unassured user is a double differencing technique.

19. The method of claim 13, further comprising:

extending communication to a second assured user, by the assured user, when at least one datalink obstruction is present.

20. The method of claim 13, further comprising:

extending communication to a plurality of assured users, by the assured user, when at least one datalink obstruction is present.

* * * * *